June 3, 1969  T. H. NOREN  3,447,491
SECTIONAL OVAL-SHAPED TABLE FOR ENDLESS CONVEYOR FOR DISHWASHER
Filed April 19, 1967
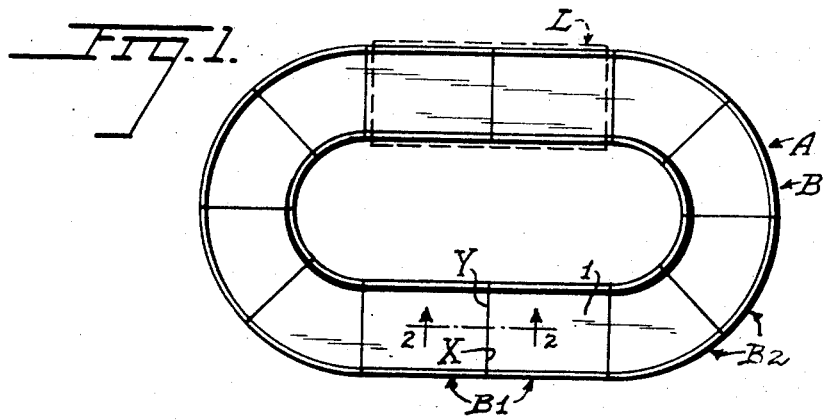
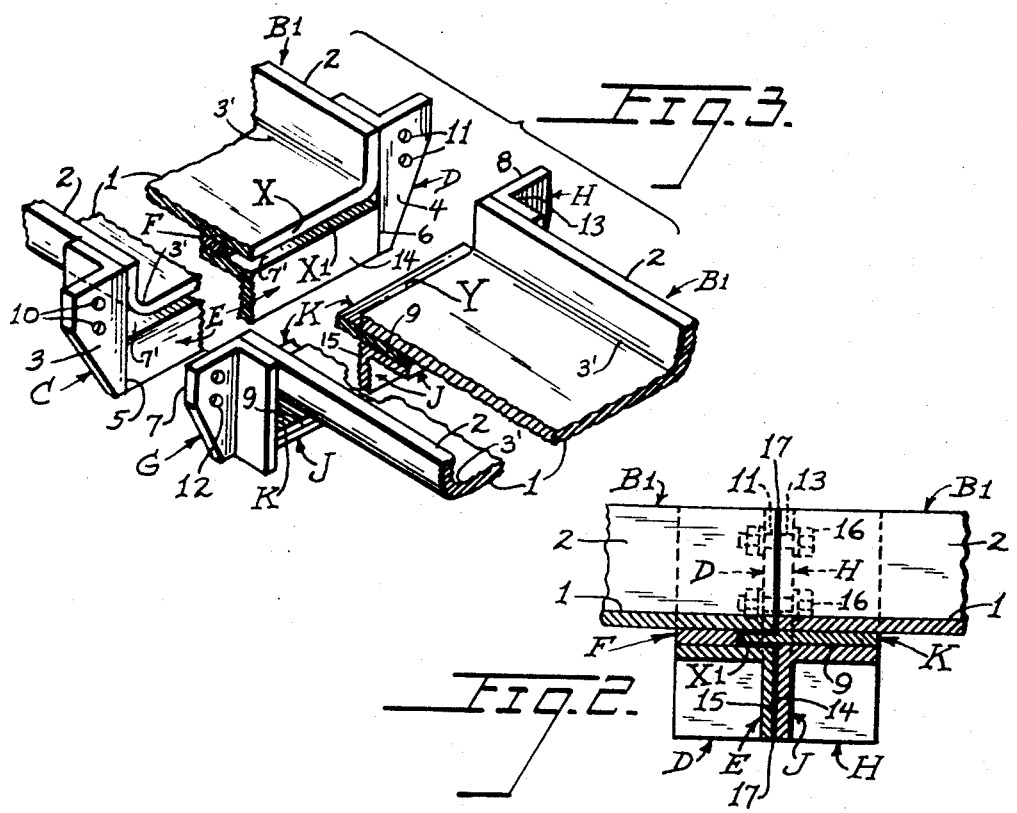
INVENTOR
TORE H. NOREN
BY William R. Piper
ATTORNEY

United States Patent Office 3,447,491
Patented June 3, 1969

3,447,491
SECTIONAL OVAL-SHAPED TABLE FOR ENDLESS CONVEYOR FOR DISHWASHER
Tore H. Noren, 1350 Donner Ave., San Francisco, Calif. 94124
Filed Apr. 19, 1967, Ser. No. 632,093
Int. Cl. A47b 33/00
U.S. Cl. 108—64     7 Claims

ABSTRACT OF THE DISCLOSURE

Some commercial dishwashers are used in conjunction with oval-shaped tables for guiding dishwashing trays into and out from the dishwasher. The oval-shaped table supports an endless conveyor composed of a plurality of dollies interconnected together and traveling over and guided by the table. The table is large and is formed in sections. The inventive feature is the forming of the table sections with interconnecting joints that can be made watertight without the necessity of welding.

BACKGROUND OF THE INVENTION

Field of the invention

The oval-shaped table has a portion that extends through the dishwasher. The endless conveyor of dollies receives dish-carrying trays and is supported and guided by the table. Means is provided for driving the dolly train around the track for carrying soiled dishes into the dishwasher and removing the washed dishes therefrom.

Description of the prior art

The patent to Clyde R. Weihe Jr. et al., on a Conveyor For Dishwasher, Patent No. 3,117,668, issued Jan. 4, 1964, discloses an oval-shaped table for supporting and guiding an endless conveyor of dish-carrying dollies. A portion of the table and conveyor extends through a commercial dishwasher. The table is large and must be built in sections and transported to the place where it is to be used and there assembled. The sections are welded together to make a water-tight table and the welding requires special equipment and often results in a warped joint. The table can not be subsequently dismantled.

SUMMARY OF THE INVENTION

An object of my invention is to provide a sectional oval-shaped table in which a specially designed watertight joint is provided between the abutting edges of adjacent sections. The sections can be bolted together and the joints between the sections are filled with a non-hardening mastic that will make the joints watertight without the need of welding. The table sections can be disassembled later for further moving should that be desired.

A further object of my invention is to provide a sectional table with watertight joints between sections and each section has guide rails that form an endless track for the wheels of the dish-carrying dollies when the table sections are connected together to form the table.

BRIEF DESCRIPTION OF THE DRAWING

FIGURE 1 is a plan view of a sectional conveyor table especially designed to be used with a dishwashing machine.

FIGURE 2 is an enlarged longitudinal section to two adjoining sections of the conveyor table and illustrates the novel type of water-tight joint that removably connects the two sections together.

FIGURE 3 is an isometric view of two adjoining sections of the conveyor table shown slightly spaced apart so that the two parts of the interconnecting joint can be shown in greater detail.

DESCRIPTION OF THE PREFERRED EMBODIMENT

In carrying out my invention, I show an oval-shaped table that is made up of sections that can be removably connected to each other to make a water-tight seal at each joint. The table need not be oval in shape and may be of any length and width desired. The table is designed to be used with an endless conveyor for carrying soiled dishes to a dishwasher for washing and rinsing them and for removing the clean dishes. The oval-shaped table is indicated generally at A in FIGURE 1 and is built up from sections, shown at B. If the table is to be oval in shape, certain sections B1 will be straight and other sections B2 will be arcuate in shape. It is obvious that the table could be square or rectangular in shape rather than oval if that should be desired.

The table sections B, whether straight or arcuate in shape, are removably connected together by water-tight joints so as to make the entire table leak-proof. I have shown in enlarged detail one of the water-tight joints in section. The particular joint illustrated interconnects two adjoining straight table sections B1 of FIGURE 1, although it could be any other two adjoining table sections whether straight or arcuate. Also the sections B may be of any length and width desired. Legs, not shown, support the table sections.

Each table section B1 or B2 is in the form of a relatively wide channel that has a web portion 1 that forms the top of the table and side flanges 2 that extend upwardly from the portion 1. The corners between the side flanges 2 and the adjacent portion of the table top 1 are gently curved as shown at 3' so that the entire section can be thoroughly cleaned as often as necessary, see FIGURE 3.

The water-tight joint that interconnects each pair of adjoining sections has one-half the joint at the end X of one section B, and has the complemental other half of the joint at the end Y of the adjoining section B. Each section B of the table will have one-half the water-tight joint at one end of the section and the other half of another joint at the opposite end thereof. A detailed description of one of the water-tight joints will suffice for all the joints. The water-tight joints are not illustrated in FIGURE 1 because of the smallness of the scale for the drawing.

At the end X of the table section B1, shown in FIGURES 2 and 3, I mount side brackets C and D, and these are welded or otherwise secured to the side flanges 2 so that the faces 3 and 4 of these side brackets C and D, respectively, will either lie flush with the end X or will be spaced to the rear of the end a slight distance so that the end will extend slightly beyond the faces. A transversely extending angle E is positioned between the side brackets C and D and has its ends welded or otherwise secured to the brackets at 5 and 6. The top side 7' of the angle E is spaced from and parallels the underside of the table top 1 so as to form a tongue-receiving slot X1. A spacing strip F is placed between the top 7' of the angle E and the underside of the table top 1, and constitutes a closure for the inner end of the tongue-receiving slot X1. The ends of the spacing strip F abut the adjacent surfaces of the side brackets C and D, and may be welded thereto.

At the end Y of the adjacent table section B1, shown in FIGURES 2 and 3, I mount additional side brackets G and H, and these are welded or otherwise secured to the adjacent surfaces of the side flanges 2 so that the faces 7 and 8 of these two brackets will either lie flush with the end Y or will be spaced slightly to the rear of the end so that this end will extend slightly beyond the faces. A transversely extending angle J is positioned between the side brackets G and H, and has its ends welded or otherwise secured to the brackets. The top side 9 of the angle J is spaced from and parallels the adjacent underside of the table top 1, and a tongue K is placed between the angle top 9 and the table top. The sides of the tongue K are welded to the brackets G and H, and the tongue projects beyond the end Y of the table top section B1 to which it is attached and it is adapted to be received in the tongue-receiving slot X1 in the adjoining table top section. The angle J and tongue K are welded into place so as to make a water-tight connection.

FIGURE 3 shows the laterally extending wings of the side brackets C and D, provided with bolt receiving openings 10 and 11, respectively. In like manner the laterally extending wings of the other side brackets G and H, are provided with bolt-receiving openings 12 and 13, respectively, which will align with the holes 10 and 11 when the two table top sections are brought together and the tongue K enters the slot X1.

Before the two table top sections are brought together, the end X, slot X1, the faces 3 and 4 of the brackets C and D, and the vertical face 14, have a layer of non-drying mastic applied thereto. Also a layer of the same mastic is applied to the end Y of the other table top section, and to the tongue K, the faces 7 and 8 of the brackets G and H, and to the vertical face 15 of the angle J. The two sections are now brought together and bolts 16 are inserted in the aligned openings 10 and 12 and also in the aligned openings 11 and 13. A thin non-drying mastic layer 17 will fill all parts of the joints and will make it water-tight as shown in FIGURE 2.

In FIGURE 1, all of the table top sections B1 and B2 have been connected together by joining them in the manner just described. A dish-carrying endless conveyor, not shown, travels along the table top and moves the soiled dishes into the dishwasher L, indicated diagrammatically by the dash lines in the figure, where the dishes are washed and rinsed. The endless conveyor then removes the clean dishes from the dishwasher and they may then be lifted from the conveyor.

The water-tight joint forms a rigid connection between adjoining table top sections B. The non-drying mastic will permit the table top sections to be freed from one another when the bolts 16 are removed and the table sections can be moved to a new location for reassembly. The table sections are small enough to be movable through a door opening and then assembled to make a water-tight table top of any length and width desired. Also a damaged table section can be removed for repair and then connected back in its proper place The joint is simple in construction and is made water-tight without the necessity of welding the sections together.

I claim:
1. A sectional table top including at least two sections:
 (a) a first section having a top and upwardly extending side flanges that end in a common plane which extends transversely to the length of the section;
 (b) brackets secured to said flanges and having outwardly extending wings with bolt-receiving openings therein;
 (c) said first section having a tongue-receiving slot in its end;
 (d) a second section having a top and upwardly extending said flanges that are adapted to be aligned with similar parts of said first section;
 (e) a tongue carried by said second section and receivable in said tongue-receiving slot of said first section when the two sections are brought into abutting relation;
 (f) brackets secured to the flanges of said second section and having outwardly extending wings with bolt-receiving openings adapted to align with said first-mentioned openings which said tongue is received in said slot;
 (g) a waterproof mastic covering the abutting portions of the two sections; and
 (h) bolts in said openings for securing the brackets of the two sections together for forming a water-tight joint therebetween.

2. The combination as set forth in claim 1: and in which
 (a) said tongue-receiving slot is formed by an angle that extends transversely between the brackets of said first section and has a top that is spaced away from the table top of the same section a distance slightly greater than the thickness of said tongue so as to provide space for a layer of mastic between said tongue and the adjacent walls of said slot.

3. The combination as set forth in claim 2: and in which
 (a) said second section has an angle that extends transversely between the brackets of said second section, the angle having a surface that extends at an angle to said tongue;
 (b) the angle secured to said first section having a surface that is brought into confronting relation with the surface on said second mentioned angle when said tongue is received in said slot;
 (c) the layer of mastic that covers the abutting portions of the two sections also extending between the two confronting surfaces of the two angles to make a water-tight joint between the two.

4. The combination as set forth in claim 1: and in which
 (a) the brackets on said first section having surfaces that are brought into confronting relation with surfaces on the brackets of said second section when said tongue is received in said slot;
 (b) the layer of mastic that covers the abutting portions of the two sections also extending between the confronting surfaces of the brackets on both sections so as to make a water-tight joint between these confronting surfaces.

5. A sectional table top including at least two abutting sections, each having a flat upper surface with upwardly extending and parallel sides; the sides of one section abutting the corresponding sides of the other section;
 (a) a first section having a tongue-receiving socket at one end with a width substantially the same as the distance between the two sides of the same section and is coexistensive with the width of the flat upper surface of said section;
 (b) a second section having a tongue with a width substantially the same as that of the socket and being receivable therein; there being a slight space between all surfaces of the tongue and the adjacent surfaces of the socket so as to receive a mastic;
 (c) a layer of mastic lying between the abutting portions of the two sections and filling the space between the tongue and the socket for making a water-tight seal between both sections;
 (d) an outwardly extending flange carried by each section and disposed adjacent to the abutting edge of the section so that the flanges will be positioned in close proximity to each other when the two sections abut each other; and
 (e) means for securing the flanges of the two sections together.

6. The combination as set forth in claim 5: and in which
 (a) the flange of each section extends across the underside of the flat upper surface and up along the outer surfaces of the two parallel sides and said securing means includes bolts being positioned at spaced points so as to connect the two flanges together along the undersides of the two flat upper surfaces portions of the sections and up along the two sides of the sections.

7. The combination as set forth in claim 6: and in which
 (a) the mastic also extends between the adjacent surface of the opposed flanges.

(References on following page)

References Cited

UNITED STATES PATENTS

| | | | |
|---|---|---|---|
| 942,014 | 11/1909 | Schneider et al. | 312—111 X |
| 2,403,338 | 7/1946 | Butler | 108—64 |
| 2,464,160 | 3/1949 | Stanitz | 108—64 |
| 2,808,624 | 10/1957 | Sullivan | 52—584 |
| 2,905,334 | 9/1959 | Gottschalk et al. | 108—64 |
| 2,992,001 | 7/1961 | Ferris | 52—593 |
| 3,001,844 | 9/1961 | Spring | 108—64 |

FOREIGN PATENTS

| | | |
|---|---|---|
| 506,902 | 11/1954 | Canada. |

FRANCIS K. ZUGEL, *Primary Examiner.*

U.S. Cl. X.R.

108—114